(12) United States Patent
Ruan

(10) Patent No.: US 8,191,864 B2
(45) Date of Patent: *Jun. 5, 2012

(54) JACK BAR WITH EXTENDABLE TUBES AND FIXTURING MECHANISM

(75) Inventor: Bu Qin Ruan, Zhejiang (CN)

(73) Assignee: Zhejiang Topsun Logistic Control Co., Ltd, Yuhuan District Tai Zhou (CN)

( * ) Notice: Subject to any disclaimer, the term of this patent is extended or adjusted under 35 U.S.C. 154(b) by 335 days.

This patent is subject to a terminal disclaimer.

(21) Appl. No.: 11/999,265

(22) Filed: Dec. 3, 2007

(65) Prior Publication Data
US 2008/0210915 A1 Sep. 4, 2008

Related U.S. Application Data

(63) Continuation of application No. 10/906,768, filed on Mar. 4, 2005, now Pat. No. 7,311,294.

(51) Int. Cl.
*B66F 3/02* (2006.01)

(52) U.S. Cl. .......................... 254/95; 254/100

(58) Field of Classification Search ................ 254/95, 254/8, 100, 98, 97, 109–111, 8 R
See application file for complete search history.

(56) References Cited

U.S. PATENT DOCUMENTS

| | | | | |
|---|---|---|---|---|
| 1,936,596 A | * | 11/1933 | Goebert | 254/95 |
| 2,646,956 A | * | 7/1953 | Cadwell et al. | 248/170 |
| 3,583,743 A | * | 6/1971 | Newell | 292/339 |
| 6,101,702 A | * | 8/2000 | Claycomb et al. | 29/426.4 |
| 7,311,294 B1 | * | 12/2007 | Ruan | 254/108 |
| 7,331,567 B2 | * | 2/2008 | Li | 254/95 |
| 2008/0210915 A1 | * | 9/2008 | Ruan | 254/95 |

* cited by examiner

*Primary Examiner* — Lee D Wilson

(74) *Attorney, Agent, or Firm* — Bergman & Song LLP; Michael Bergman

(57) ABSTRACT

A jack bar includes an outer tube, an inner tube and a positioner tube coaxially located. The positioner tube is extendable to adjust a length to the jack bar in use while enabling the jack bar to be retracted for storage. The jack bar further includes a clamp configured to receive tubes of various shapes. The clamp is further configured to prevent twisting or turning of clamped tubes.

18 Claims, 5 Drawing Sheets

JACK BAR WITH EXTENDABLE TUBES AND FIXTURING MECHANISM

CROSS-REFERENCES

The present application is a continuation of U.S. patent application Ser. No. 10/906,768, filed Mar. 4, 2005 now U.S. Pat. No. 7,311,294 the disclosure of which is herewith incorporated by reference in its entirety.

The present invention relates to mechanical technologies and in particular to fixturing devices used for securing goods in a vehicle.

BACKGROUND

During the transportation of goods in vehicles, it is necessary to secure the goods in position to prevent loss or damage to the goods due to movement during transportation or by collision with other goods in the vehicle, and to retain the goods within the vehicle.

Typically goods are transported inside containers loaded onto vehicles. One of the tools used to secure goods in containers is a jack bar. FIG. 1 shows a conventional jack bar 50. The jack bar 50 includes a main body 1, a main axle 2, a lever 3 (also referred to as a "handle"), a gear rack 4, and a tube 5. The jack bar 50 has a first end 55 (also referred to as a "gear rack end") and a second end 60 (also referred to as a "tube end"). Typically, the jack bar 50 is operated by reciprocating the lever 3. The movement of the lever 3 drives the gear rack 4 outward to cause the two ends 55, 60 of the jack bar 50 to push against side walls of a container. The two ends 55, 60 typically include rubber feet 65, 70 for gripping. The jack bar 50 is positioned and located in the container to limit motion of goods during transportation. The length of this conventional jack bar 50 in operation is determined by the distance between the two side walls of the container. Accordingly, jack bars 50 of this conventional configuration are typically long with respect to the cargo space making the jack bars themselves difficult to store and transport thereby adding to shipping costs.

The assembly of the conventional jack bar of FIG. 1 typically includes welds such as the weld 75 between the main body 1 and the tube 5. The welds at times result in a less than optimal product. For example, the welds between the main body and the tube require polishing and rust proofing in order to maintain structural integrity and in order for the welds to be aesthetically acceptable. If the jack bar main body 1 and tube 5 separate, the jack bar 50 can be repaired only by rewelding which is a difficult repair. In addition, welds may include defects such as skewing, slag inclusion, or porosity. Further, the welding process requires extensive tooling.

For the foregoing reasons, there is a need for an improved jack bar.

SUMMARY

The present invention is directed to an improved jack bar including an extendable-retractable tubular structure. The jack bar of the present invention may be applied over a wide variety of adjustable lengths with a shorter overall length and a longer extended length compared to conventional jack bars.

The jack bar of the present invention includes a plurality of co-axial tubes configured to mate as at least one inner tube inside an outer tube. The length of the jack bar can be adjusted by linking the tubes together. In other words, it is possible to select various connection locations between the inner and outer tubes based on the side wall distance of the container and to fix the position through the use of a positioner. These features provide a wide range of applicable distances for the jack bar of the present invention. When the jack bar is not in use, the inner tube is retracted into the outer tube to reduce the total length of the jack bar thereby making the jack bar of the present invention easier to store than conventional jack bars.

The positioner has at least one spring-loaded positioning pin configured to mate with at least one positioning hole in the outer tube. The number of positioning holes is typically equal to the number of positioning pins. Each positioning hole is configured to receive a positioning pin. During positioning, the inner tube is moved to match positioning pins to positioning holes, thereby enabling the fixturing between the inner and outer tubes to fix the length of the jack bar.

The tube fixturing mechanism is located inside of the main body of the jack bar. The tube fixturing mechanism includes a tubular-shaped clamp located on one side of the main body. The tube-shaped clamp is used to clamp the inner tube. The clamp includes an axial opening having two lips, one on each side of the opening. A bolt passes through a hole on one of the lips for securing the clamp by screwing the bolt into a tapped hole that is on the other lip of the opening.

When using the tube fixturing mechanism to secure the inner tube, the bolt on the side of the lip is loosened and the inner tube is inserted into the clamp. The bolt is then tightened to clamp the two lips together to secure the inner tube to the main body of the jack bar.

A cross section of the jack bar clamp is a square-circular shape. This shape enables the tube fixturing mechanism to secure square tubes and round tubes as well as tubes of other geometries. The tube fixturing mechanism in the jack bar of the present invention is located in the main body. The mechanism itself is the several positioning protrusions that are on the inner walls, flat or curved, of the clamp. These protrusions allow additional friction forces to be exerted between the clamp and the tubes to be connected, thus reducing the possibility of a tube falling off or twisting.

The advantages of the present invention include the adjustable length of the jack bar. That is, the jack bar can be readily adjusted to accommodate differences in cargo space side wall distances, thereby increasing the versatility of the jack bar. A further advantage of the present invention is the positioning device between the inner and outer tube that simplifies the operation of the jack bar. A still further advantage of the present invention is the reduced overall length of the jack bar. When the jack bar is not in use, the length can be reduced further than conventional jack bars thereby increasing the storability and transport.

Compared to currently available technology, the tube fixturing mechanism is based on the combination of clamp and tightening of a bolt to realize the connection between the inner tube and the main body. The mechanism is simple and effective, with no welding required to simplify the manufacturing process. Since the clamp adopts to no particular cross-section geometry, it is possible to connect the main body with either square or round tubes, or with tubes of other geometries.

In the event of loosening between the tube and the main body during operation of the clamp equipped jack bar the clamp may be re-secured by tightening the bolt. This re-secures the clamp to the tube, while providing ease of operation.

The present invention together with the above and other advantages may best be understood from the following detailed description of the embodiments of the invention illustrated in the drawings, wherein:

DETAILED DESCRIPTION OF THE INVENTION

A jack bar according to the present invention includes an extendable-retractable tubular structure. The tubes are co-axial and configured to mate one inside the other. A positioning device enables the jack bar to be extended to fit a cargo container.

Figure 1:
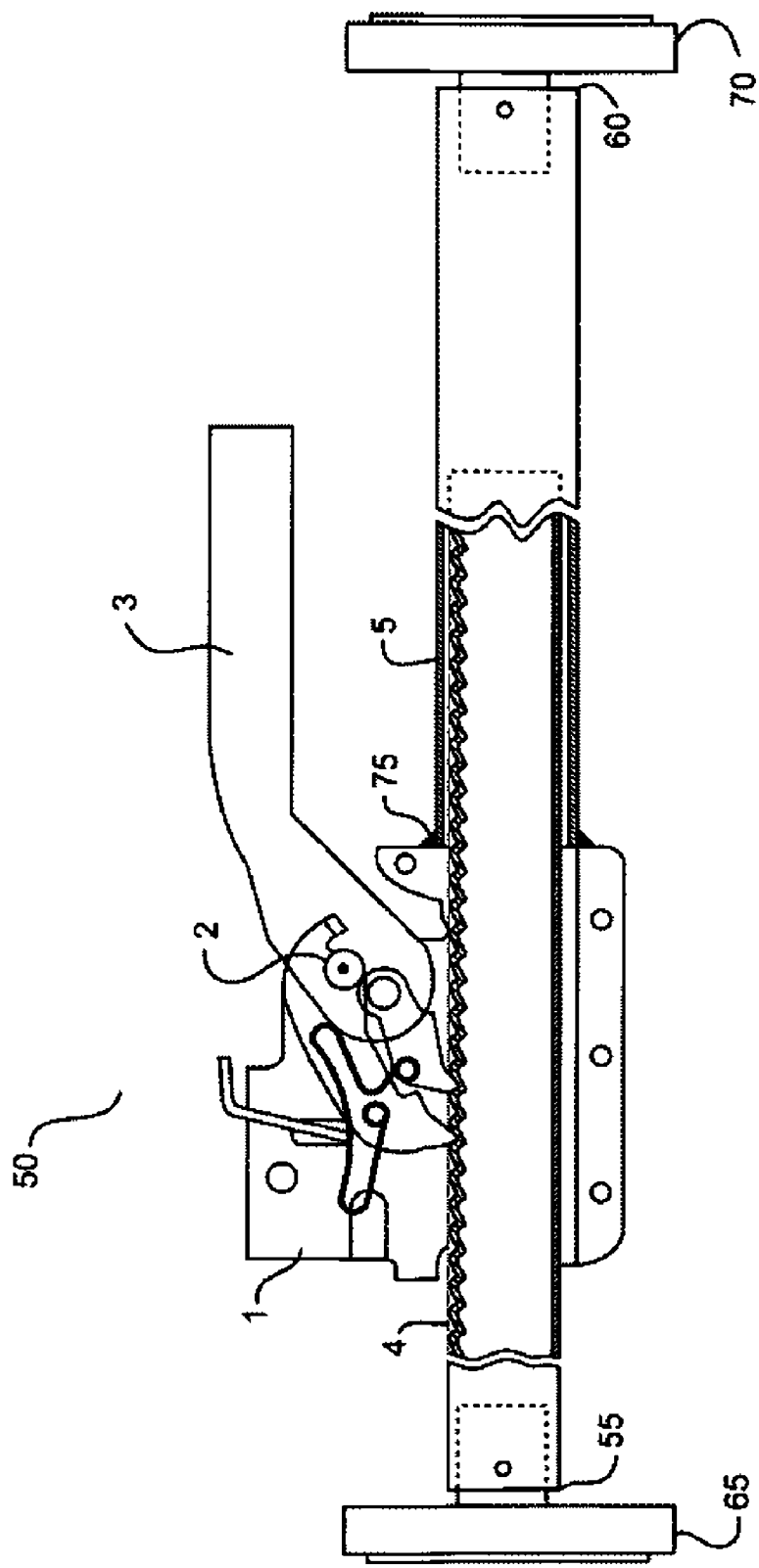
FIG. 1 is a conventional jack bar.
Figure 2:
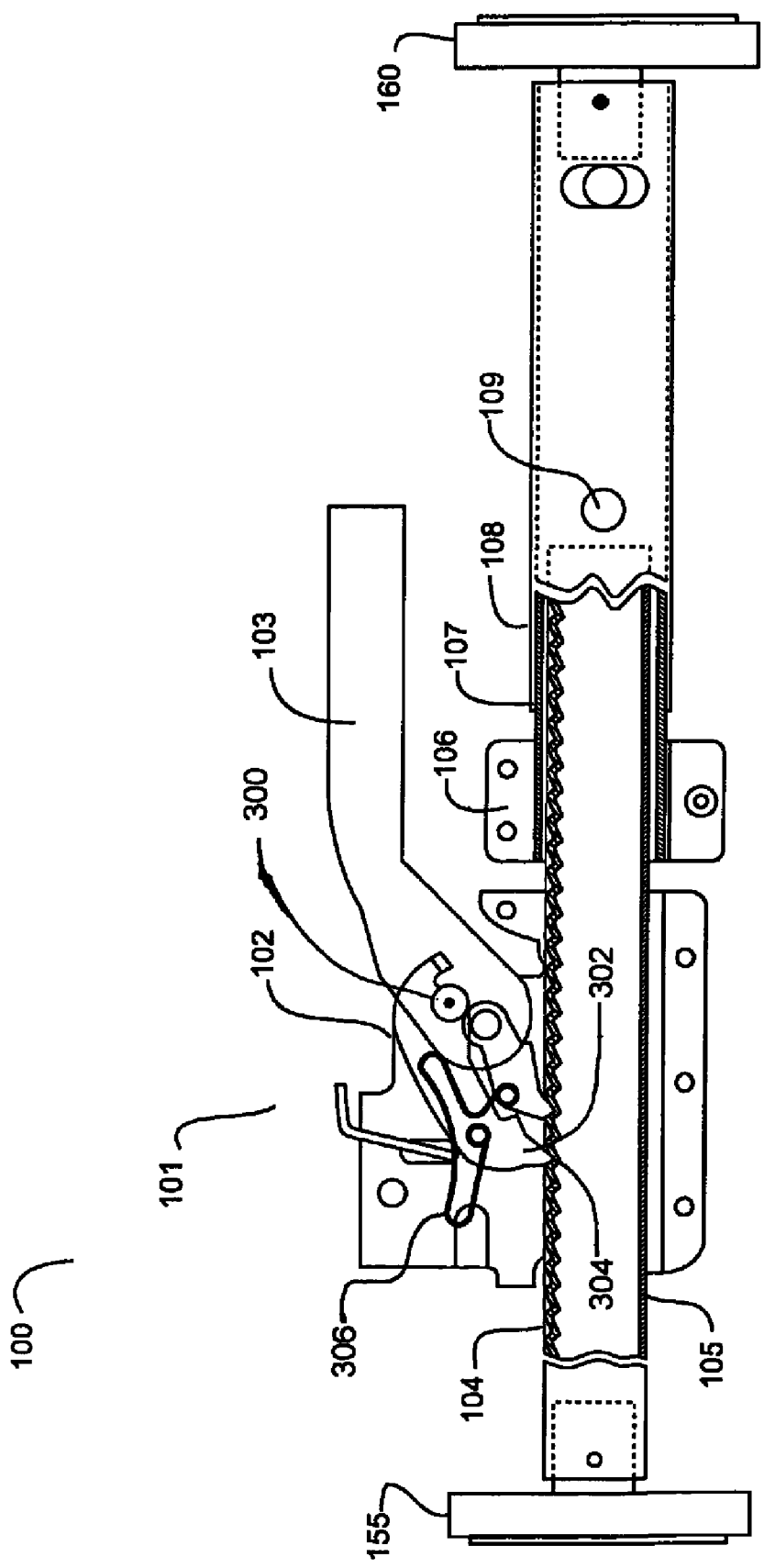
FIG. 2 is a side cut-away view of a retractable tubular jack bar according to principles of the invention.

FIG. 2 is a side cut-away view of a retractable tubular jack bar 100 according to principles of the invention. The jack bar 100 includes a main body 101. A first tube 105 connects to the main body 101. A gear rack 104 is located on the outside of the first tube 105. The first tube 105 is shaped and configured to mate with a second tube 107. The second tube 107 is configured to mate with a third tube 108, also referred to as the outer tube. The third tube 108 includes a plurality of positioning holes 109. The main body 101 includes a clamp 106 to fix the first tube 105 with respect to the second tube 107. The clamp 106 is on one side of the main body 101.

In operation, the second tube 107 is positioned with respect to the third tube 108 with spring-loaded positioning pins and the positioning holes 109 in the third tube 108. The positioning pins and positioning holes are described in more detail below with regard to FIG. 3.

A unidirectional driving mechanism 102 on the main body 101 acts through a reciprocating lever 103 to extend the gear rack 104 outwards from the second tube 107 to push the ends 155, 160 of the jack bar 100 against the side walls of a container (not shown) to secure goods. The clamp 106 clamps the first tube 105 with the gear rack 104 in position with respect to the second tube 107.

The unidirectional driving mechanism 102 includes an axle member 300 and a detent mechanism 302. In the illustrated embodiment, the detent mechanism 302 includes a ratchet pawl with a vertex edge 304. Also in the driving mechanism of the illustrated embodiment is a spring 306.

In the present embodiment of the invention, the first tube 105 and the second tube 107 are inserted into the outer tube 108. In an alternative embodiment of the invention, three or more inner tubes are coaxial with the outer tube and are configured similarly to the tubes 105, 107, 108 shown in FIG. 2 in order to be similarly extendable and retractable.

Figure 3:
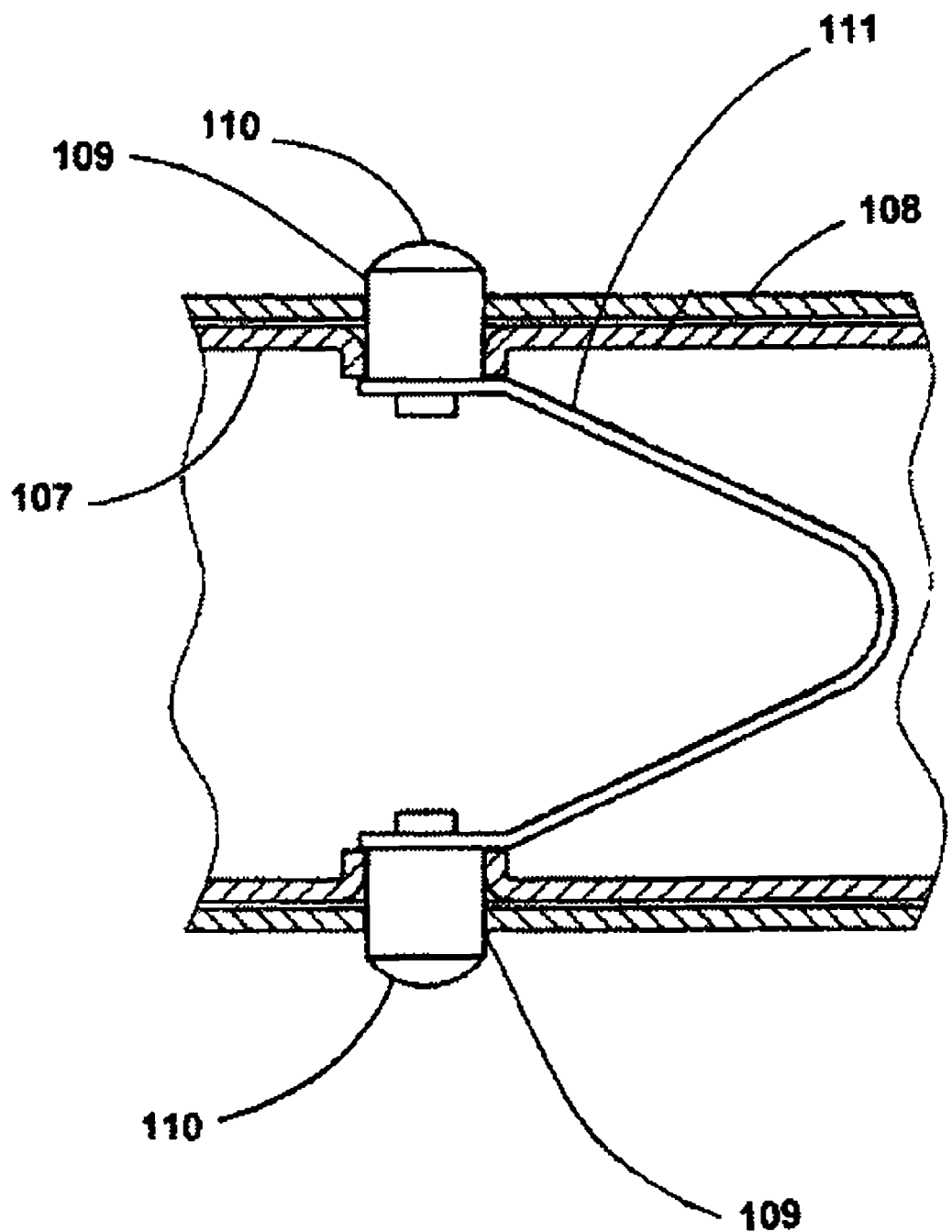
FIG. 3 is a side cross-section view of the jack bar showing spring-loaded positioning pins located in positioning holes.

FIG. 3 is a side cross-section view of the jack bar 100 showing spring-loaded positioning pins in the second and third tubes 107, 108 of the jack bar 100. As shown in FIG. 3, positioning pins 110 are located on the surface of inner tube 107. A spring 111 pushes against the pins 110 from inside the inner tube 107. On the surface of the outer tube 108 are positioning holes 109 where the locations of these holes correspond to the locations of the positioning pins 110 that are on the inner tube 107. The force available from spring 111 pushes the pins 110 outward through positioning holes 109 in the outer tube 108. The diameters of these positioning holes are generally slightly larger than the corresponding diameters of the pins 110. Thus the positioning between the inner and outer tubes 107, 108 can be realized by moving the inner and outer tubes 107, 108 relative to one another, such that the pins 110 mate with the positioning holes 109. If length change is desired, all that is required is to push the positioning pins 110 down and move the inner and outer tubes 107, 108 to align the positioning pins with different positioning holes.

In the jack bar 100 of the present invention, the complete jack bar 100 can be reduced to minimal length for storage or transportation by the following: as long as the gear rack 104 is pushed all the way back to the inner tube 107, and the inner tube 107 is pushed all the way into the outer tube 108.

Figure 4:
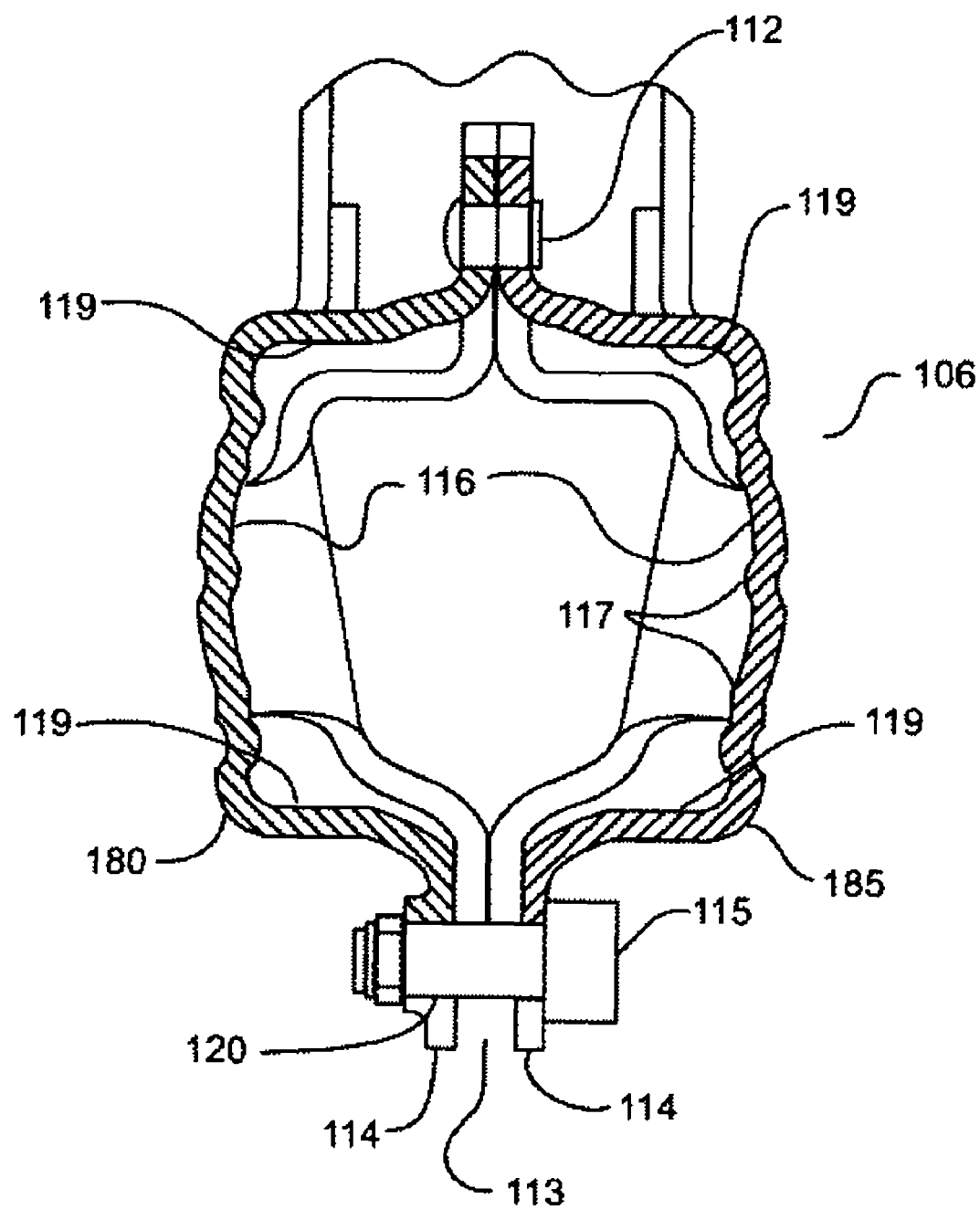
FIG. 4 is a cross-section view of the clamp for the jack bar of FIG. 2.

FIG. 4 is a cross-section through the clamp 106 of the jack bar 100 viewed perpendicularly to the jack bar axis. As discussed above (in relation to FIG. 2), the clamp 106 is located on one side of the main body 101 and the clamp is connected to the second tube 107. The clamp 106 is generally square in cross-section where each edge and each corner of the "square" is curved as shown in FIG. 4. This results in a square-circular combination shape capable of receiving various configurations of tubes. The clamp 106 has two parts 180, 185 which are secured with a rivet 112 on one side of the clamp 106. An opening 113 on the opposite side has lips 114 bent toward the outside of the clamp 106. One lip includes a tapped hole or nut 120 and the other lip has a corresponding through hole 118. A bolt 115 is disposed in the through hole 118 and the tapped hole 120. The bolt 115 is used to tighten the lips 114 together. After the inner tube 105 is inserted into the clamp 106, the clamp 106 can be tightened around the tube 105 by turning the bolt 115. This draws the two parts 180, 185 of the clamp 106 together to close the two sides of the opening 113.

As shown in FIG. 4, the inner wall of the clamp 106 consists of two types of surfaces, flat surfaces 119 and curved surfaces 116. The flat 119 and curved 116 surfaces include several small protrusions 117. This inner wall design enables the coupling of clamp 106 with either a square tube or a round tube, or with tubes of other cross-sectional geometries. The presence of the protrusions 117 increases friction between the clamp 106 and an inserted tube. This prevents the inserted tube from sliding out, and from rotating inside the clamp 106.

Figure 5:
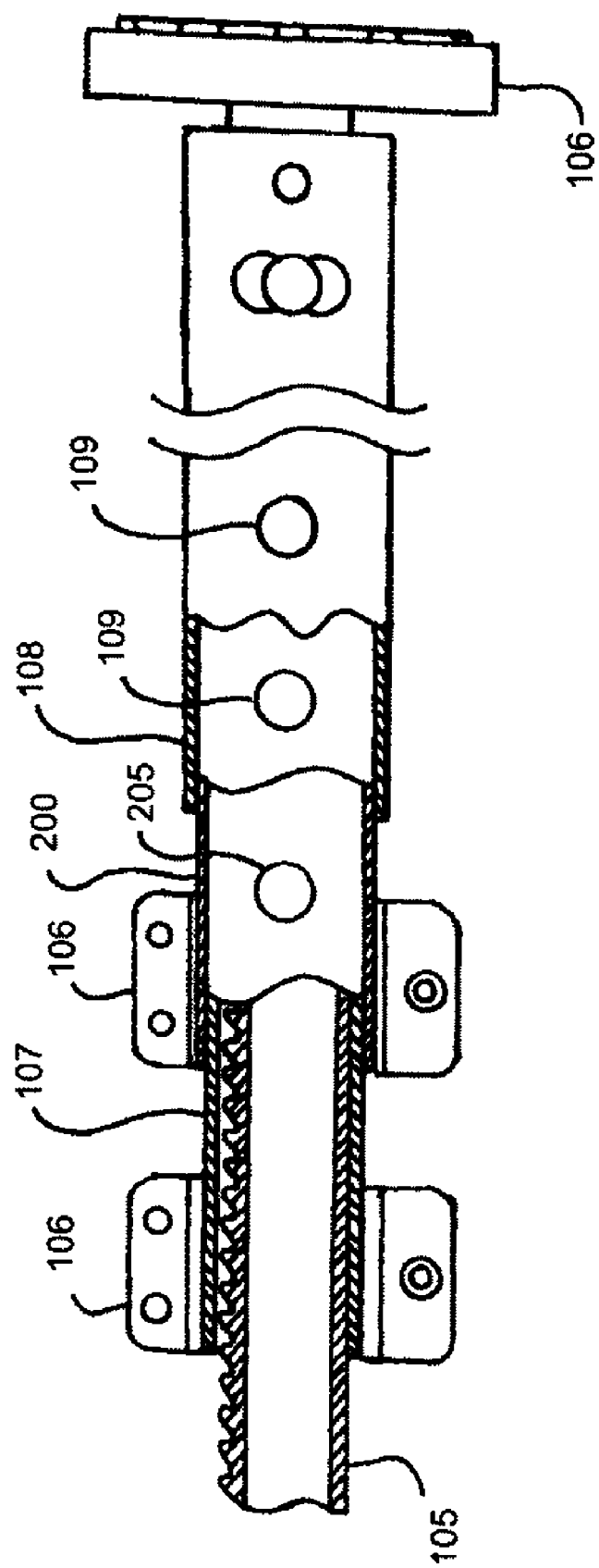
FIG. 5 is a second side cut-away view of a portion of a retractable tubular jack bar according to principles of the invention.

FIG. 5 is a second side cut-away view of a portion of a retractable tubular jack bar according to principles of the invention. A jack bar includes an outer tube 108; an inner tube 105 co-axially mated to the outer tube 108; and a positioner tube 107 co-axial to the inner tube 105 and the outer tube 108. The positioner tube 107 is located in between the inner tube 105 and the outer tube 108. The positioner tube 107 includes a positioner 109 to fix the location of the positioner tube 107 with respect to the outer tube 108. The positioner tube 107 includes a drive mechanism 102 (shown in FIG. 2) to locate the inner tube 105 with respect to the positioner tube 107. The positioner 107 further includes a clamp 106 to clamp the inner tube 105 in position with respect to the positioner tube 107. The clamp 106 is closed with a bolt. The jack bar further includes a fourth tube 200 co-axial to the inner tube 105, the outer tube 108 and the positioner tube 107. The fourth tube 200 includes a second positioner 205 that is configurable to provide additional length to the jack bar.

This newly designed jack bar is realized through the use of a set of inner and outer tubes inserted into one another, or a set of several tubes implemented in the same fashion to enable the adjustment of jack bar length. In other words, it is possible to select different positions based on the available cargo space in the container, with the assistance of a positioner. In this fashion, it is likely to expand the usability of the jack bar. When the jack bar is not needed, it is possible to retract the inner tube into the outer tube the furthest degree to reduce the total length of the jack bar for ease of storage.

In the aforementioned newly designed jack bar, the positioning device is the number of positioning pins that is on the surface of the inner tube, with the corresponding positioning springs that push the pins outward, and the mating positioning holes that are on the surface of the outer tube. The number of positioning holes matches with the positioning pins. The diameter of each of the positioning holes is slightly bigger than that of the positioning pins. When it is required to adjust the length of the tube, all that has to be performed is to move the inner and outer tube with respect to one another to allow positioning pins to mate with the positioning holes at desired locations. In this way, the desired positioning is achieved.

The tube fixturing mechanism is located on the main body of the jack bar, with the characteristics as follows: The tubular positioner is located on one side of the main body with an opening that opens axially. There are lips on each side of the opening that curve outward, with a through hole on one lip and a tapped hole the other. A bolt with a diameter smaller than the size of the lips is inserted into the hole to be screwed into the tapped hole, and the lips can be tightened by screwing the bolt into the tapped hole to tighten the two sides of the lips.

The tube diameter of the jack bar is slightly bigger than the positioner diameter when the two lips are closed. When using the mechanism to secure a tube, it is necessary to loosen the bolt to insert the tube into the positioner. Afterwards, the tube can be connected to the main body by tightening the bolt to clamp the two lips together to secure the tube onto the positioner.

The positioner cross section in the aforementioned jack bar is located on the main body, and is square-circular in shape, which enables the connection with square tubes, round tubes or tubes of other cross section geometries.

The tube fixturing mechanism is located on the main body of the jack bar, and is defined by a number of protrusions on the inner flat or curve surfaces. The protrusions will increase the friction force between the positioning mechanism and the tube to reduce the possibility of tubes falling off or twisting.

It is to be understood that the above-identified embodiments are simply illustrative of the principles of the invention. Various and other modifications and changes may be made by those skilled in the art which will embody the principles of the invention and fall within the spirit and scope thereof.

The invention claimed is:

1. A jack bar comprising:
an inner member having a first longitudinal axis,
an outer tube, said outer tube having a second longitudinal axis and a first external surface region;
a driver, said driver including a first body portion and a second handle portion, said second handle portion being movably coupled to said inner member to urge a translation of said inner member along said second longitudinal axis, said first body portion having a second internal surface region, said second internal surface region being adapted to be disposed adjacent to said first external surface region;
a removable fixturing member, said removable fixturing member being operatively coupled to said first body portion and being adapted to urge said second internal surface region into contact with said first external surface region so as to establish a releasable frictional coupling therebetween;
an axle member, said axle member having a third longitudinal axis, said third longitudinal axis being disposed substantially orthogonal to said second longitudinal axis, said axle member being supported at first and second bearing surfaces of said body portion, said axle portion being adapted to support a detent member, said detent member being adapted for a pivotal motion around said third longitudinal axis of said axle member; and
an elastic device, said elastic device being adapted to urge said detent member through said pivotal motion.

2. A jack bar as defined in claim 1 wherein said inner member comprises a further tube.

3. A jack bar as defined in claim 2 wherein said further tube comprises a generally polygonal tube.

4. A jack bar as defined in claim 1 wherein said elastic device comprises a spring.

5. A jack bar as defined in claim 1 wherein said detent member as first and second generally curved surface regions, said first and second generally curved surface regions converging at a vertex edge.

6. A jack bar as defined in claim 1 wherein said removable fixturing member has an externally threaded surface.

7. A jack bar as defined in claim 1 wherein said removable fixturing member comprises a bolt.

8. A jack bar as defined in claim 7 wherein said bolt is adapted to be placed in tension to urge said second internal surface region into contact with said first external surface region.

9. A jack bar as defined in claim 1 wherein said detent member comprises a ratchet pawl.

10. A jack bar as defined in claim 1 wherein said pivotal motion is adapted to engage said detent member with a further surface region of said inner member.

11. A Jack bar as defined in claim 10 wherein said further surface region of said inner member comprises a ratchet configuration.

12. A jack bar comprising:
a first substantially tubular longitudinal member, said first substantially tubular longitudinal member having an internal surface region, said internal surface region defining a longitudinal cavity therewithin;
a second longitudinal member, said second longitudinal member being adapted to be disposed within said longitudinal cavity;
a driving mechanism, said driving mechanism being adapted to urge a displacement of said second longitudinal member with respect to said first longitudinal member along a mutual longitudinal axis thereof, said driving mechanism including a clamp, said clamp being adapted to removably frictionally couple said driving mechanism to an external surface region of said first substantially tubular longitudinal member.

13. A jack bar as defined in claim 12 wherein said clamp comprises an internal surface region substantially conforming to said external surface region of said first substantially tubular longitudinal member.

14. A jack bar as defined in claim 12 wherein said clamp comprises first and second fasteners adapted to couple first and second portions of said clamp circumferentially around said substantially tubular longitudinal member.

15. A jack bar as defined in claim 14 wherein at least one of said first and second fasteners comprises a bolt.

16. A jack bar as defined in claim 14 wherein said first and second portions of said clamp comprise respective first and second flange portions, said first and second flange portions having respective first and second through holes there-through, said first and second through holes being adapted to mutually receive said first fastener therewithin.

17. A jack bar as defined in claim 12 wherein said substantially tubular longitudinal member comprises a tubular member having a substantially circular cross-section.

18. A jack bar as defined in claim 12 wherein said substantially tubular longitudinal member comprises a tubular member having a generally polygonal cross-section.

* * * * *